United States Patent Office 3,006,943
Patented Oct. 31, 1961

3,006,943
PREPARATION OF PHENYL-SUBSTITUTED CHLOROSILANES
Siegfried Nitzsche and Paul Buchheit, Burghausen, Upper Bavaria, Germany, assignors to Wacker-Chemie G.m.b.H., Munich, Bavaria, Germany
No Drawing. Filed Feb. 6, 1959, Ser. No. 791,541
Claims priority, application Germany Feb. 25, 1958
2 Claims. (Cl. 260—448.2)

This invention relates to a method of preparing phenyl substituted chlorosilanes.

Phenyl substituted chlorosilanes are known and are used as water repellent materials and as intermediates in the preparation of organopolysiloxanes for use as varnish resins, oils, elastomers, and so forth. However, the commercial methods for preparing the phenylchlorosilanes generally suffer because poor yields of the desired products are obtained and/or the starting materials employed are expensive.

Another problem facing the silicone industry relates to the large amounts of residue produced every year as by-products of the so-called direct process method for preparing organochlorosilanes. For example, methyl chloride is reacted directly with silicon at elevated temperatures, employing various catalysts and producing methylchlorosilanes plus a variety of materials as residue. Many attempts have been made to salvage some of this by-produced residue but no use has been found for most of the large volume of residue produced.

The present invention is designed to alleviate both of the problems described above. The object of this invention is to prepare phenyl substituted chlorosilanes from the residue formed during the direct process preparation of organochlorosilanes.

Phenylchlorosilanes of the general formula

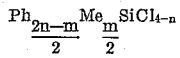

where Ph is phenyl, Me is methyl, $n=1$ to 3 and $m=0$ to 4 can be prepared from the chlorodisilanes of the general formula $Me_mSi_2Cl_{6-m}$ found in the direct process residue by phenylation followed by cleavage with chlorine.

The chlorodisilanes employed as starting materials herein are obtained as by-products from the preparation of methylchlorosilanes through the reaction of methyl chloride and silicon. These by-produced chlorosilicon materials contain structural elements including

| $Cl_3Si$— | $MeCl_2Si$— | $Me_2ClSi$— | and | $Me_3Si$— |
|---|---|---|---|---|
| (Q) | (T) | (D) | | (M) |

These structural elements can be phenylated to produce new structural elements as follows:

The "Q" elements become PhCl$_2$Si— Ph$_2$ClSi— or Ph$_3$Si.
(T) (D) (M)

The "T" elements become MePhClSi— or MePh$_2$Si—.
(D) (M)

The "D" elements become Me$_2$PhSi—.
(M)

The "M" elements remain unchanged.

It has been found that the proportion of T structural elements in the direct process residue is greater than the proportion of Q, D and M elements. A majority of the T elements become D elements upon phenylation hence this method favors the production of the D elements.

The two steps of the method of this invention are phenylation and chlorinolysis. These steps have not been applied to direct process residue heretofore. It was not recognized that desirable products could be so obtained.

The phenylation can be carried out in any desired manner. The direct process residue can be phenylated in the form in which it occurs when removed from the direct process reaction zone. However, the problem of separation of products and purity of end product can be greatly reduced by isolating the desired disilane starting materials employed in the method of this invention from the direct process residue. The disilane starting materials can be separated from the residue by rectification.

The phenylation can be carried out by mixing the disilanes either in the crude form or in the rectified form, with chlorobenzene and an inert higher boiling solvent such as toluene, xylene or dibutylether. A calculated amount of sodium metal is added gradually in small pieces to the mixture with concurrent stirring and heating, if necessary, to a temperature above the melting point of the sodium metal. The phenylation occurs rapidly and the phenylated disilanes can be removed from the reaction mass by filtering off the salt which has been formed and separating the phenylated disilanes from the solvent.

Obvious alternatives to the foregoing method are apparent to one skilled in the art. The phenylation step can be carried out in any desired manner and the method outlined above is merely the best phenylation method known to the inventor.

The phenylated disilanes are redissolved in solvent, preferably CCl$_4$, for the chlorinolysis step. The solution of phenylated disilanes is brought into contact with chlorine and the chlorinolysis occurs spontaneously without catalyst or external heat. The reaction is exothermic and some cooling of the reacting zone may be required. The phenylated disilanes react with the chlorine until all the disilanes are used up. When no more chlorine is taken up by the reaction mass the reaction is at an end and the solvent is removed. The phenylchlorosilanes are separated by rectification.

The phenylation may be controlled with respect to the number of phenyl groups introduced into the disilanes. Of course, some disilanes will be such that no phenyls are introduced (M type elements) or a maximum of 1, 2 or 3 phenyls can be introduced into the D, T and Q type elements respectively. However, the predominant structure element is of the T type and 1 or 2 phenyls can be introduced into each element (i.e. MeCl$_2$Si— has two replaceable chlorines, the disilane molecule

having a total of four replaceable chlorines). All of the chlorines can be replaced by phenyl groups or only a desired proportion. The ratio of chlorobenzene to replaceable chlorine in the disilane mixture can be adjusted to accomplish the desired replacement.

The phenylchlorosilanes prepared by this method can be used per se to render water repellent materials which are not sensitive to HCl. The primary use, however, is as an intermediate in the preparation of siloxane copolymers for any of the uses presently known for such materials.

The examples are included to aid in understanding and practicing this invention. In the examples, Ph represents a phenyl radical, Me a methyl radical and all parts and percentages are based on weight unless otherwise indicated. The invention is not limited by the examples but is delineated in the claims.

EXAMPLE 1

The residue obtained from the direct process reaction of MeCl and Si was carefully rectified. 700 parts of chlorodisilanes were obtained in the temperature range 120° to 160° C. The disilane material had an average empirical formula Si$_2$Me$_{2.42}$Cl$_{3.58}$. The disilane was mixed with an equivalent volume of toluene and 560 parts chlorobenzene. 228 parts of sodium metal pellets were added gradually to the reaction mixture with concurrent stirring at a temperature above 100° C. The reaction completed, the mass was filtered and the solvent and phenylated chlorodisilane were separated. 814 parts of the chlorodisilane were obtained and were dissolved in CCl$_4$. Chlorine was bubbled into the mixture and 220 parts chlorine were taken up in the resulting reaction to produce 1034 parts of the monosilanes corresponding to the disilanes in the starting material. This mass was vacuum-distilled at 11 mm. of Hg and produced silanes as tabulated below:

*Table I*

| Boiling range | Percent yield, percent | Amount yield, parts | Product |
|---|---|---|---|
| 80°–145° C | 30.9 | 214 / 105 | PhMeSiCl$_2$ / PhMe$_2$SiCl |
| 145°–180° C | 32.2 | 240 / 93 | Ph$_2$MeSiCl / Ph$_2$SiCl$_2$ |
| 180°–240° C | 13.9 | 68 / 76 | Ph$_2$SiCl$_2$ / Ph$_2$MeSiCl |
| Residue | | 23 / 237 | / Unidentified |

EXAMPLE 2

Following the method of Example 1, 684 parts of disilane was obtained in the boiling range 155° to 159° C. by rectification from direct process residue. The disilane mixture was dissolved in toluene and phenylated with 1351 parts chlorobenzene and 552 g. sodium metal pellets. Upon filtering and distilling off the solvent, 936 parts of a waxlike crystallizate was obtained. This was dissolved in CCl$_4$ and chlorine bubbled into the solution at 60° to 80° C. 154 parts of chlorine were taken up during the reaction and the resulting phenylmethylchloromonosilanes were separated from the solvent and distilled at 11 mm. of Hg. The products recovered were weighed and identified and are tabulated below.

*Table II*

| Boiling range | Amount and type of silane |
|---|---|
| 70°–85° C | 8.6 parts PhMe$_2$SiCl. |
| 85°–148° C | 78.8 parts Ph$_2$SiCl$_2$. / 68.0 parts Ph$_2$MeSiCl. |
| 148°–170° C | 448 parts Ph$_2$MeSiCl. |
| 170°–230° C | 195.3 parts Ph$_3$SiCl. |
| 230°–250° C | 91.5 parts Ph$_3$SiCl. / 89 parts Ph$_4$Si. |
| 250°–340° C | 53.7 parts Ph$_4$Si. / 38.3 parts Ph$_3$SiCl. |
| Residue | 57.7 parts unidentified. |

EXAMPLE 3

Following the method of Example 1, 2287 parts of direct process residue boiling in the range 155° to 159° C. were reacted with 2251 parts of chlorobenzene in the presence of 920 parts of sodium metal pellets. The reaction yielded 2177 parts of a viscous, golden yellow mixture of phenylmethylchlorodisilanes. The phenylation yield was almost 70%. The mixture of said silanes was dissolved in an equal volume of CCl$_4$ and chlorine was bubbled into the mixture. The reaction raised the temperature of the reaction mass to above 80° C. and 463 parts of chlorine were taken up by the mixture during the reaction. The chlorinolysis produced 2640 parts of phenylmethylchloromonosilanes. This product was distilled at a pressure of 12 mm. of Hg and the range 75° C. to 135° C., 615 parts containing 70% PhMeSiCl$_2$ and 30% PhMe$_2$SiCl was obtained; in the range 135° to 280° C., 1709 parts containing 52% Ph$_2$SiCl$_2$ and 48% Ph$_2$MeSiCl.

EXAMPLE 4

One thousand parts of a direct process residue distillate, with a boiling range of 155° to 159° C. was reacted with 491 parts of chlorobenzene in the presence of 202 parts of Na. The viscous phenylated product was thereafter reacted with 160 parts chlorine and yielded 1007 parts of phenylmethylchloromonosilanes. The product was distilled as in Example 3 to yield 274 parts MeSiCl$_3$, 364 parts PhMeSiCl$_2$ and 379 parts higher phenylated silanes.

That which is claimed is:

1. The method of preparing phenyl substituted chloromonosilanes consisting essentially of (1) separating as a mixture substantially all of the disilane by-products from the reaction of CH$_3$Cl and Si to produce methylchlorosilanes, (2) phenylating the said disilanes by mixing the disilanes with chlorobenzene in an inert high-boiling solvent and thereafter adding sodium metal to the mixture with concurrent heating and stirring to a temperature above the melting point of the sodium metal and (3) contacting the phenylated disilanes with chlorine.

2. The method of claim 1 further characterized in that (4) the phenylchloromonosilanes produced are separated by fractional distillation.

References Cited in the file of this patent

UNITED STATES PATENTS

| 2,598,434 | Mohler et al. | May 27, 1952 |
| 2,787,627 | Kuriyagawa et al. | Apr. 2, 1957 |
| 2,908,698 | Kuriyagawa et al. | Oct. 13, 1959 |
| 2,914,548 | Schroll | Nov. 24, 1959 |

OTHER REFERENCES

Schumb et al.: "Jour. Am. Chem. Soc.," vol. 63 (1941), pp. 93–95.

Kumada et al.: "Jour. Org. Chem.," vol. 21, November 1956, pp. 1264–68.